United States Patent [19]
Meusinger et al.

[11] Patent Number: 6,129,861
[45] Date of Patent: Oct. 10, 2000

[54] MEMBRANE REACTOR FOR PRODUCING CO- AND $CO_2$-FREE HYDROGEN

[75] Inventors: Josefin Meusinger, Bischofsheim, Germany; Lambertus Haart, Heerlen, Netherlands; Ulrich Stimming, Munich, Germany

[73] Assignee: Forschungszentrum Jülich GmbH, Jülich, Germany

[21] Appl. No.: 09/185,228

[22] Filed: Nov. 3, 1998

Related U.S. Application Data

[63] Continuation of application No. PCT/DE97/00880, Apr. 26, 1997.

[30] Foreign Application Priority Data

May 10, 1996 [DE] Germany .................. 196 18 816

[51] Int. Cl.⁷ ................. C06D 1/02; C01B 3/26; B01J 8/08; B01J 7/00
[52] U.S. Cl. ............. 252/376; 423/652; 422/217; 422/239
[58] Field of Search ............. 252/376; 423/652; 422/217, 239

[56] References Cited

U.S. PATENT DOCUMENTS

| | | |
|---|---|---|
| 3,469,944 | 9/1969 | Bocard et al. . |
| 4,840,783 | 6/1989 | Quang et al. . |
| 5,229,102 | 7/1993 | Minet et al. ............. 423/652 |
| 5,612,012 | 3/1997 | Soma et al. . |
| 5,861,137 | 1/1999 | Edlund ................. 423/652 |
| 5,904,913 | 5/1999 | Bohm et al. ............ 423/648.1 |

FOREIGN PATENT DOCUMENTS 0 729 196   8/1996   European Pat. Off. .

OTHER PUBLICATIONS

Patent Abstr. of Japan vol. 095, No. 001, Feb. 28, 1995 (JP 06 283189A), Oct. 7, 1994.
Patent Abstr. of Japan vol. 016, No. 265 (C–0951), Jun. 16, 1992 (JP 04 065301A).
Patent Abstr. of Japan vol. 013, No. 099 (E–724) Mar. 8, 1989 (JP 63 274063A).
Patent Abstr. of Japan vol. 014, No. 242 (C–0721) May 23, 1990 (JP 02 063545A).

*Primary Examiner*—Paul J. Killos
*Assistant Examiner*—J. Parsa
*Attorney, Agent, or Firm*—Klaus J. Bach

[57] ABSTRACT

In a reactor and a method for the conversion of methanol to hydrogen wherein the reactor comprises first and second chambers divided by a membrane which is permeable for hydrogen and CO but not for $CO_2$, the methanol is converted in the first chamber by a catalyst disposed therein to a gas mixture comprising hydrogen, carbon monoxide and carbon dioxide, and the hydrogen and carbon monoxide pass through the membrane into the second chamber wherein the CO is converted by another catalyst disposed therein to methane.

2 Claims, 1 Drawing Sheet

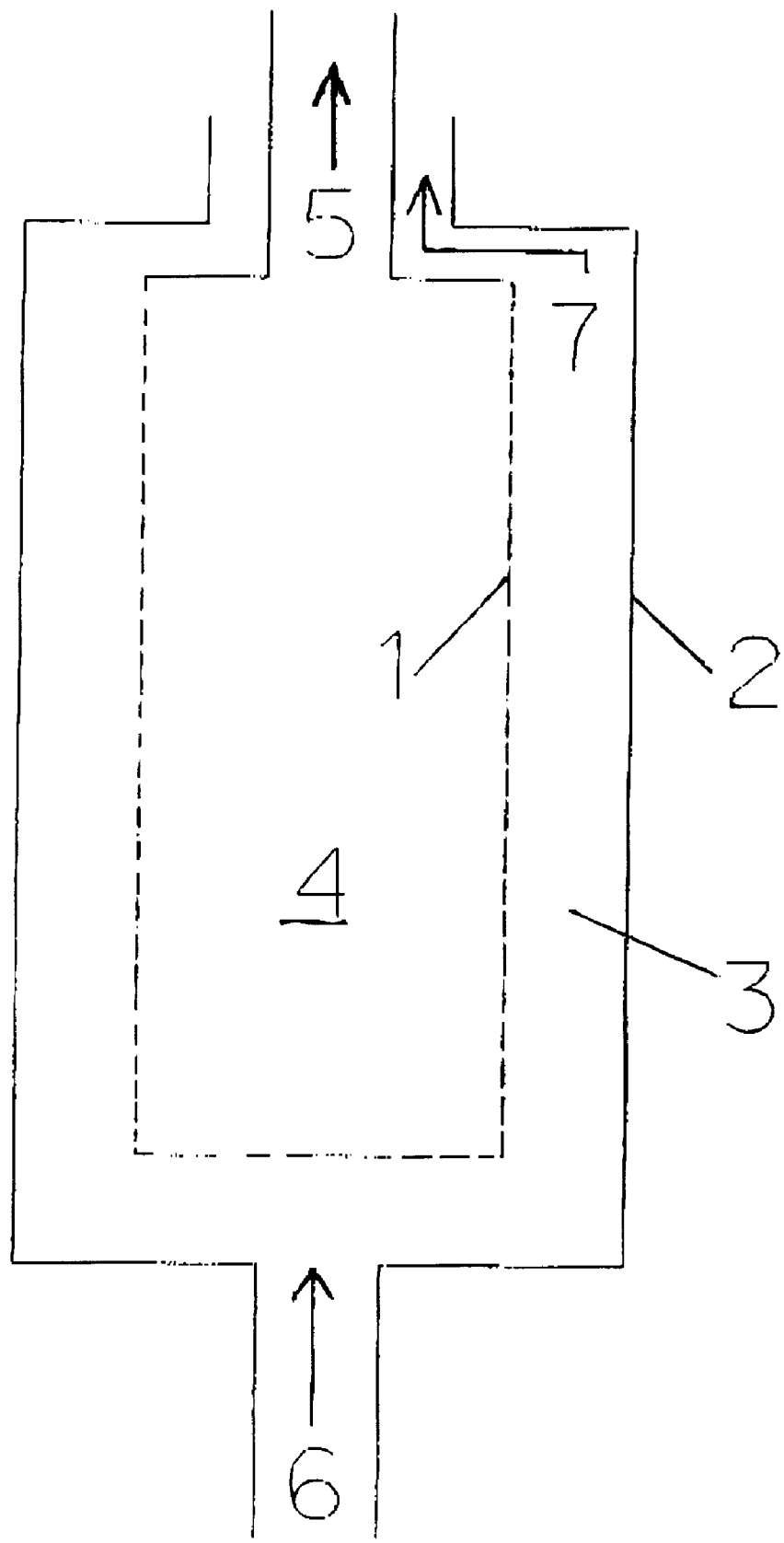

MEMBRANE REACTOR FOR PRODUCING CO- AND $CO_2$-FREE HYDROGEN

This is a continuation in part application of pending international application PCT/DE97/00880 filed Apr. 26, 1997 and claiming priority of German application 196 18 816.4 filed May 10, 1996.

BACKGROUND OF THE INVENTION

The invention concerns a membrane reactor for the conversion of methanol into CO- and $CO_2$- free hydrogen.

Such reactors are considered for use in connection with fuel cells, particularly with PEM fuel cells. The latter are being developed for future use as components of electrical vehicle drive systems.

Compared with other fuel cells, PEM fuel cells have the advantage that they use a polymer solid electrolyte which facilitates the handling and the construction of compact fuel cells. PEM fuel cells have a high power density of about 1 W/cm$^2$ at temperatures of 80° C. For the oxidation of pure hydrogen in acid electrolytes such as in a PEM fuel cell, Platinum (Pt) has been found to be the most effective electrocatalyst. However, since the infrastructure present for the operation of motor vehicles should also be useable in the future, it should be possible to use liquid fuels that is liquid methanol. Liquid methanol, however, must be converted in the motor vehicle to hydrogen by a reforming reaction. During the conversion of methanol to hydrogen, side-products such as CO are generated which act as catalyst poisons for the electrocatalyst Pt. As a result, the power output of the fuel cell is drastically reduced if the fuel gas, that is the hydrogen, includes CO.

Consequently, the fuel gas generated by the reformer has to be treated before it is supplied to the PEM fuel cell so as to reduce the CO content to less than 10 ppm. At present, the desired purity of the fuel gas can be achieved only by using a Pd/Ag membrane. But such Pd/Ag membranes are very expensive.

In order to provide for the required purity, it is also possible to chemically convert the CO with hydrogen to methane. (methanization reaction). With the use of precious metal catalysts, it is possible to reduce the CO content in such a gas treatment unit to 10 ppm at low reaction temperatures (180° C.). It is however first necessary to remove the $CO_2$ from the gas mixture. Under corresponding reaction conditions $CO_2$ is also subject to the methanization reaction or it is converted to CO at slightly higher temperatures.

It is the object of the present invention to provide a reactor which converts methanol to hydrogen in such a way that the hydrogen can be utilized directly as combustion gas in a PEM fuel cell.

SUMMARY OF THE INVENTION

In a reactor and a method for the conversion of methanol to hydrogen, wherein the reactor comprises first and second chambers divided by a membrane which is permeable for hydrogen and CO but not for $CO_2$, the methanol is converted in the first chamber by a catalyst disposed therein to a gas mixture comprising hydrogen, carbon monoxide and carbon dioxide, and the hydrogen and carbon monoxide pass through the membrane into the second chamber wherein the CO is converted by another catalyst disposed therein to methane.

The reactor includes a membrane which divides the reactor into two chambers. The membrane filters $CO_2$ out of the hydrogen—CO—$CO_2$ mixture. It is practically impermeable for $CO_2$. CO and particularly hydrogen can pass through the membrane.

In accordance with the invention, the membrane is preferably a ceramic membrane.

Methanol is introduced into the first chamber and is converted therein into hydrogen. The conversion occurs, for example, by way of a suitable catalyst at the temperatures required for the conversion. The first chamber includes heating means for providing the required conversion temperatures. CO and hydrogen permeate through the membrane into the second chamber, in which the CO is converted the methane.

The product gas formed in the second chamber is practically free of CO and $CO_2$. It can be supplied directly to the anode side of a fuel cell.

Preferably, means are provided by which the residual gases (reaction products not diffused into the second chamber and non-converted methanol) can be utilized to generate the reaction heat needed for the methanol reforming reaction. As means for generating the reaction heat, a conventional burner can be used for example.

In an advantageous simple embodiment of the invention the reactor comprises a tubular membrane which is disposed in a tubular housing (reaction tube). An annular space is formed between the outer surface of the membrane and the inner wall of the reaction tube. This annular space is filled with a reforming catalyst and assumes the function of the first chamber (first zone). The required reaction heat is supplied to the first chamber by heating the outside wall of the reaction tube. The second chamber (second zone) is disposed within the tubular membrane which is filled with a methanization catalyst.

Because of the concentration and pressure difference between the first and second reactor chambers the hydrogen and CO gases generated in the first chamber diffuse through the membrane into the second chamber. Methanol, which has not been converted and the other (oxygen-containing) reaction products remaining in the first chamber leave the reactor by way of the annular space.

It is advantageous if means are provided which receive the residual gases from the first chamber and supply them to a heating means (burner). If necessary, the residual gases are mixed with fresh methanol and burnt so as to generate the reaction heat for the methanol reforming reaction, that is, for the heating of the first reaction zone.

The hydrogen—CO mixture in the second chamber is (sufficiently) free of $CO_2$. In the second (inner) chamber, it is in direct contact with the methanization catalyst of the reactor whereby the CO is converted to methane. The product gas is then supplied to the anode side of the PEM fuel cell.

With the tubular design, a strongly endothermal reaction is coupled with a strongly exothermal reaction by way of the permeable membrane in an advantageous manner: An undesirable temperature increase in the methanization catalyst is prevented by the reformation reaction occurring in the tubular housing.

The reactor consists preferably of ceramic materials. The membrane consists preferably of an oxide on the basis of $Al_2O_3$ and/or SiO. These materials provide for high separation factors for hydrogen/$CO_2$ under the reaction conditions of a methanol reformation. They do not age, they can easily be provided in the desired shape and they are inexpensive.

The invention will be described below in greater detail on the basis of the accompanying drawings.

BRIEF DESCRIPTION OF THE DRAWINGS

The sole FIGURE shows schematically a membrane reactor according to the invention.

DESCRIPTION OF A PREFERRED EMBODIMENT

As shown in the FIGURE in a cross-sectional view, the reactor includes a tubular membrane 1, which is disposed in a tubular housing 2. An annular space 3 is formed between the tubular housing 2 and the tubular membrane and forms a first chamber. A second chamber 4 is defined by the interior of the tubular membrane 1. At one axial end, the tubular membrane 1 is closed. At the opposite end, a discharge pipe 5 is connected to the tubular membrane for supplying the product gases to a PEM fuel cell. Methanol is supplied to the first chamber 3 by way of an admission pipe 6 connected to the tubular housing 2. Residual gases remaining in the first chamber are supplied, by way of a discharge duct 7, to a burner which is not shown in the FIGURE and the heat generated by the combustion of the residual gases is used to heat the reactor from the outside if this is necessary.

A passenger car in a 70 kW power class for example requires a fuel cell which is capable of generating 170 kW electric power. From this, the hydrogen flow to be provided is caluclated to be 0.158 mol/s. This hydrogen must be available in a pure form (less than 10 ppm CO) from the second chamber. Based on experimentally determined permeation rates for ceramic membranes at 200° C. for hydrogen ($20 \times 10^{-7}$ mol/m$^2$/s/Pa) and a pressure difference of $5 \times 10^5$ Pa a membrane surface area of at least 15.8 dm$^2$ is required.

The generation of hydrogen is based on the methanol reforming in the first zone. At a temperature of 250° C. and on the basis of the experimentally determined formation rate of hydrogen (2–4 Nm$^3$/h/dm$^3_{kat}$) the required reforming catalyst volume can be determined as 3.16 dm$^3$. If 4 liter of a highly active noble metal catalyst are placed into the second reaction zone, the CO contained in the permeate is methanized at a temperature of about 180° C. The amount of 2 Vol-% CO formed during the reforming step is reduced to 10 ppm if the permeate is in sufficient contact with the catalyst, that is, if its travel speed past the catalyst is sufficiently low.

What is claimed is:

1. A reactor for the conversion of methanol to hydrogen comprising: a reactor housing, a membrane disposed in said reactor housing and dividing said reactor housing into first and second chambers, said membrane being permeable for hydrogen and CO but not for $CO_2$, means for supplying methanol to said first chamber, means disposed in said first chamber for converting in an endothermic reaction, said methanol to hydrogen-containing gases which pass together with CO through said membrane to said second chamber, and means disposed in said second chamber for converting CO to methane in an exothermic reaction, said exothermic reaction in said second chamber and said endothermic reaction in said first chamber being heat-coupled through said membrane through which heat is conducted from said second chamber to said first chamber to support the endothermic conversion reaction therein.

2. A reactor according to claim 1, wherein said reactor housing is tubular and said membrane is tubular and disposed within said reactor housing so as to provide an annular space between said membrane and said reactor housing forming said first chamber and the interior of said tubular membrane forming said second chamber.

* * * * *